United States Patent
Kappelman et al.

[15] 3,685,263
[45] Aug. 22, 1972

[54] DEVICE FOR HARVESTING RANDOMLY GROWN PLANTS

[72] Inventors: Benjamin O. Kappelman, 1042 E. Campus, Tempe, Ariz. 85281; Marion I. Vance, Rt. 2, Box 550, Kyrene Dr., Tempe, Ariz. 85282

[22] Filed: Dec. 3, 1971
[21] Appl. No.: 204,490

Related U.S. Application Data

[62] Division of Ser. No. 39,727, May 22, 1970.

[52] U.S. Cl. ........................................................ 56/1
[51] Int. Cl. ................................................. A01d 45/08
[58] Field of Search ....... 56/1, DIG. 2, 28, 29, 30, 33, 56/34, 35, 40–49

[56] References Cited

UNITED STATES PATENTS

| | | |
|---|---|---|
| 1,731,826 | 10/1929 | Morava .......................... 56/44 |
| 2,509,970 | 5/1950 | Edmonds ....................... 56/30 |
| 3,035,387 | 5/1962 | Bevill ............................. 56/28 |
| 3,533,224 | 10/1970 | Keck ............................. 56/28 |

*Primary Examiner*—Russell R. Kinsey
*Attorney*—Warren F. B. Lindsley

[57] ABSTRACT

A method of harvesting stalk-like plants wherein the plants are retained in substantially their upright growing position comprising the steps of converging the plants together, intertwining the tops of the plants, cutting the stalks of some of the converged intertwined plants, and feeding the intertwined cut and uncut stalks through a harvester.

2 Claims, 11 Drawing Figures

PATENTED AUG 22 1972

INVENTORS
BENJAMIN O. KAPPELMAN
MARION I. VANCE
BY Warren F.B. Lindsey
ATTORNEY

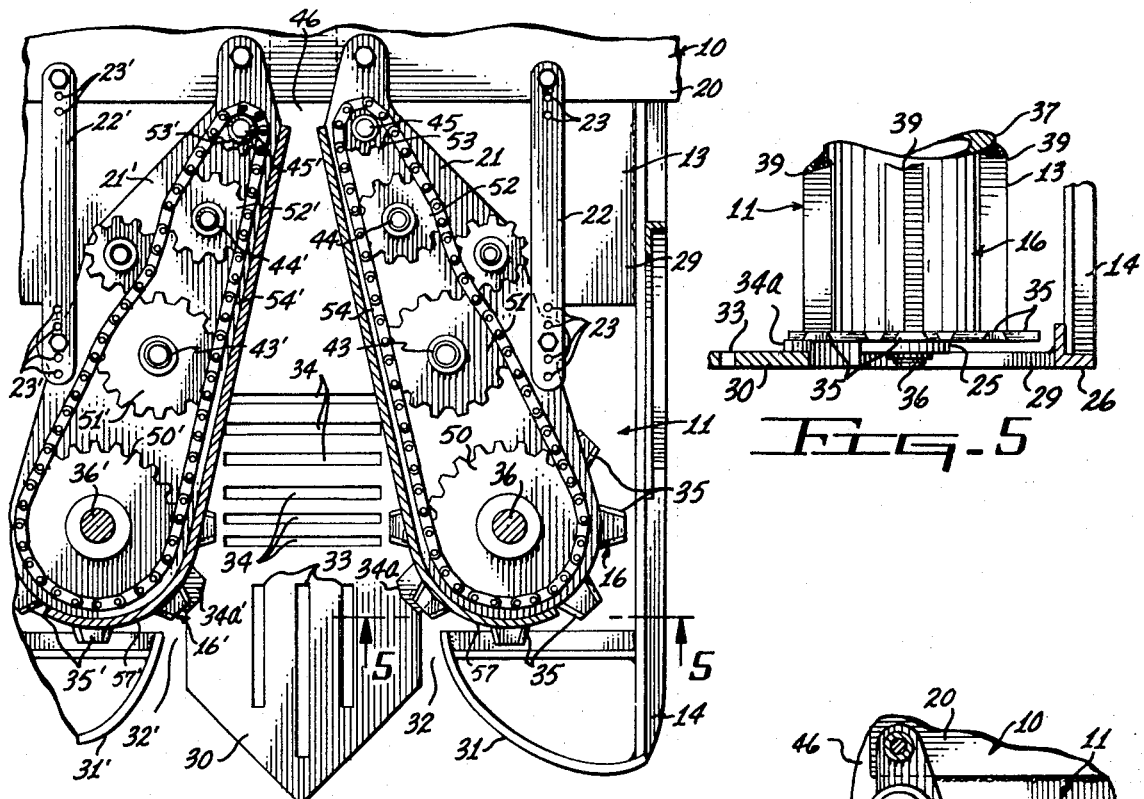
FIG-3
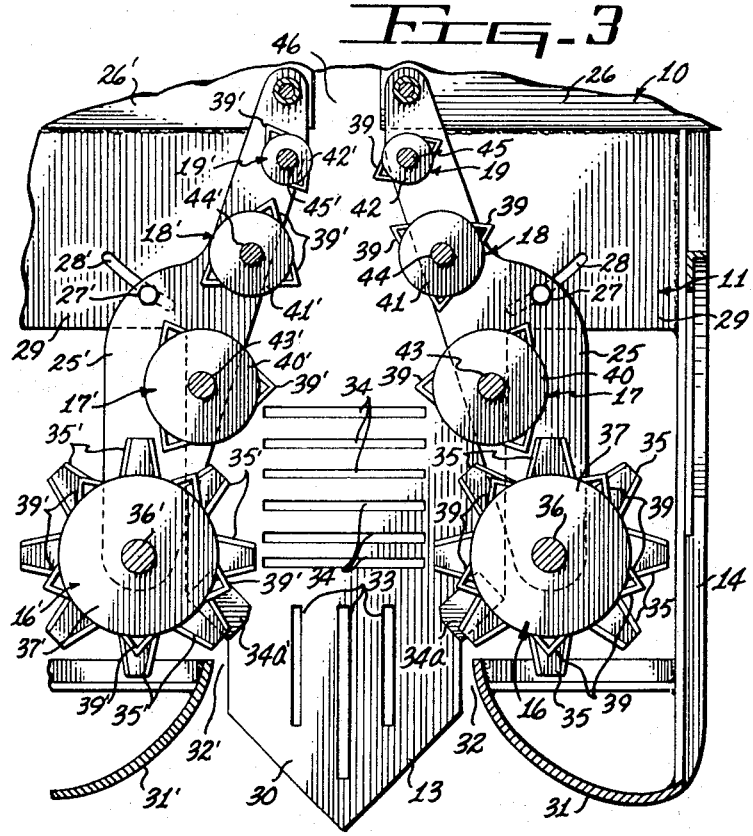
FIG-4
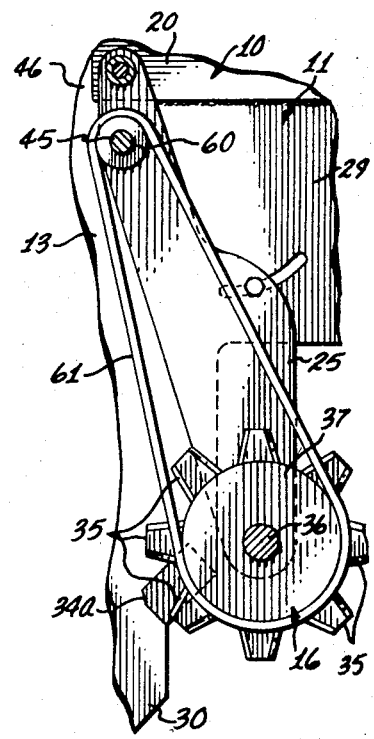
FIG-5
FIG-6
INVENTORS
BENJAMIN O. KAPPELMAN
MARION I. VANCE
BY
ATTORNEY

INVENTORS
BENJAMIN O. KAPPELMAN
MARION I. VANCE
BY
ATTORNEY

DEVICE FOR HARVESTING RANDOMLY GROWN PLANTS

BACKGROUND OF THE INVENTION

This invention relates to agricultural machinery and more particularly to cotton picking apparatus, and is a division of U. S. patent application Ser. No. 39,727 filed May 22, 1970 of Benjamin O. Kappelman and Marion I. Vance, entitled DEVICE FOR HARVESTING GROWN PLANTS.

FIELD OF THE INVENTION

With the advent of mechanical pickers, cotton is planted in rows spaced a predetermined distance apart. The stalks, if watered enough, grow tall and contain many cotton bolls, resulting in what heretofore was thought of as a bountiful harvest.

Mechanical picking apparatus straddling one or more rows was then driven through the fields to pick the cotton. The prior art picking devices knocked down enough of the cotton to result in the need for cotton salvaging devices to retrieve what is known as "down" cotton, i.e. cotton knocked to the ground during a previous picking operation. Retrieving of down cotton also involved the problem of separating dirt from the retrieved cotton.

DESCRIPTION OF THE PRIOR ART

Cotton picking agricultural apparatuses have been perfected to pick cotton from row planted cotton stalks but means are needed to increase the cotton yield per acre if cotton planting and harvesting in this country is to stay profitable. Since the mechanical picker has been perfected for row planted cotton, any change of it to harvest randomly planted cotton would require extensive design changes with resulting labor costs and production delays. Therefore, a need exists for an attachment which will make the present row harvesting apparatus capable of cutting and harvesting randomly grown cotton.

By planting and growing cotton randomly between defined rows, not only can a lot more stalks of cotton be planted per acre, but smaller stalks may be grown requiring less watering during the growing season. Smaller stalks may contain less cotton boils than row planted taller stalks, but the number of plants grown per acre can be greatly increased, thereby increasing the yield per dollar spent.

To accomplish the cutting and harvesting of randomly grown cotton between given rows with modern day harvesting equipment requires, as disclosed and claimed herein, a new and improved accumulating device for cotton harvesters.

SUMMARY OF THE INVENTION

In accordance with the invention claimed a new and improved accumulating device is provided for cotton harvesting apparatus which makes it possible to harvest randomly spaced cotton stalks grown between spaced rows or grown in longitudinal patches of predetermined widths.

It is, therefore, one object of this invention to provide a new and improved accumulating device for cotton harvesting machinery for row and randomly grown cotton stalks.

Another object of this invention is to provide a new and improved accumulator for randomly grown cotton stalks which moves them in a converging direction to the accumulator of present day row harvesters.

A further object of this invention is to provide an accumulator for selectively cutting randomly grown stalks and moving the cut stalks and uncut stalks through a throatlike structure to a cotton harvesting device.

A still further object of this invention is to provide an adaptor for a cotton harvester for harvesting strips of randomly spaced cotton stalks, which stalks are fed to the harvester in the same manner as row planted cotton stalks.

A still further object of this invention is to provide an adaptor for a cotton harvester which selectively cuts some cotton stalks and intertwines the cut stalks with uncut stalks so that when passed through the harvester the cut stalks remain in their normal upright position.

A still further object of this invention is to provide a new and improved adaptor for present day harvesting machines which increases the usefulness and product life of the machine without design changes.

A still further object of this invention is to decrease the cost of picking areas of increased plant density.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 3 is a cross-sectional view of FIG. 1 taken along the line 3—3;

FIG. 4 is a cross-sectional view of FIG. 1 taken along the line 4—4;

FIG. 5 is a cross-sectional view of FIG. 3 taken along the line 5—5;

FIG. 6 is a modification of the cutter and cotton stalk walkers shown in FIGS. 1–5;

DESCRIPTION OF THE PREFERRED EMBODIMENT

Referring more particularly to the drawings by characters of reference, FIGS. 1–5 illustrate the front end of a self-driven harvester 10 having mounted on it a new and improved device 11 for harvesting randomly grown plants which may be, for example, cotton stalks 12.

Figure 2:
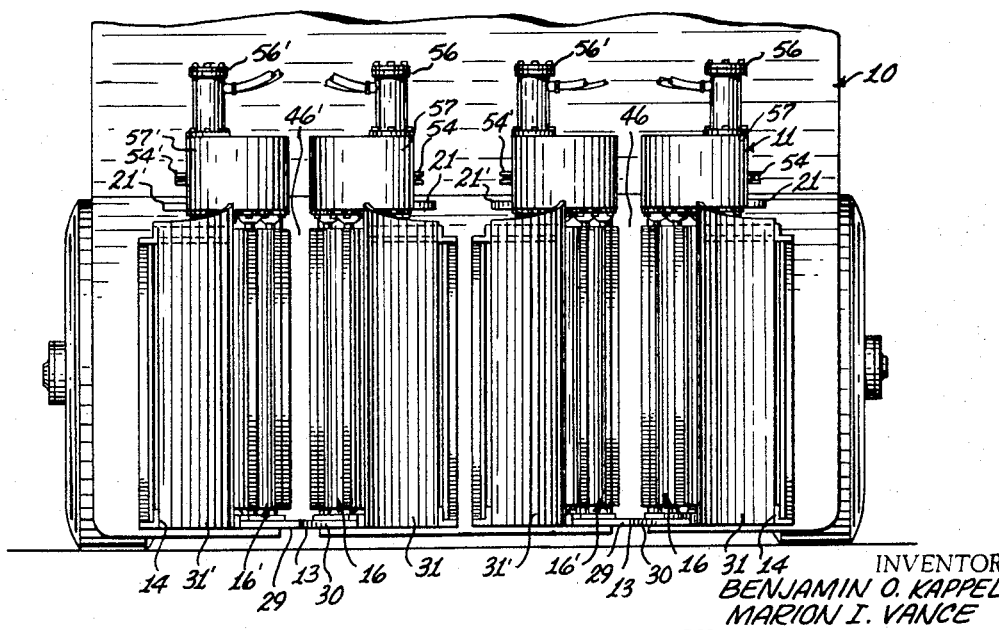
FIG. 2 is a left end view of the structure shown in FIG. 1.

Device 11 may comprise one or more accumulators 13 mounted on the front end of harvester 10 for straddling a given width of randomly planted cotton. Each of the two accumulators shown in FIG. 2 are identical so only one will be described in detail. It should be noted that the invention is not limited to the number of accumulators added to a modern harvester since more than the pair shown may be used, but is particularly directed to the method and structure of feeding, cutting and moving randomly grown cotton stalks into a modern day cotton harvester.

Each of the accumulators comprises a frame 14 for vertically supporting a pair of spacedly arranged horizontally mounted cutters 16, 16' and one or more pairs of vertically supported crop moving means such as walkers 17, 17'; 18, 18'; and 19, 19' for moving the cut cotton stalks into harvester 10.

The frame for each accumulator comprises, inter alia, a horizontally arranged top platform or shelves 21, 21'. These shelves are bolted to bracket 20 so as to be adjustably angularly positioned with respect to each other. The angular position of each platform relative to the other is determined by bracket arms 22, 22', respectively. Each bracket arm is provided with a plurality of holes 23, 23' at each end to permit various angular positioning of platform or shelves 21, 21' relative to each other in a well-known manner.

Figure 1:
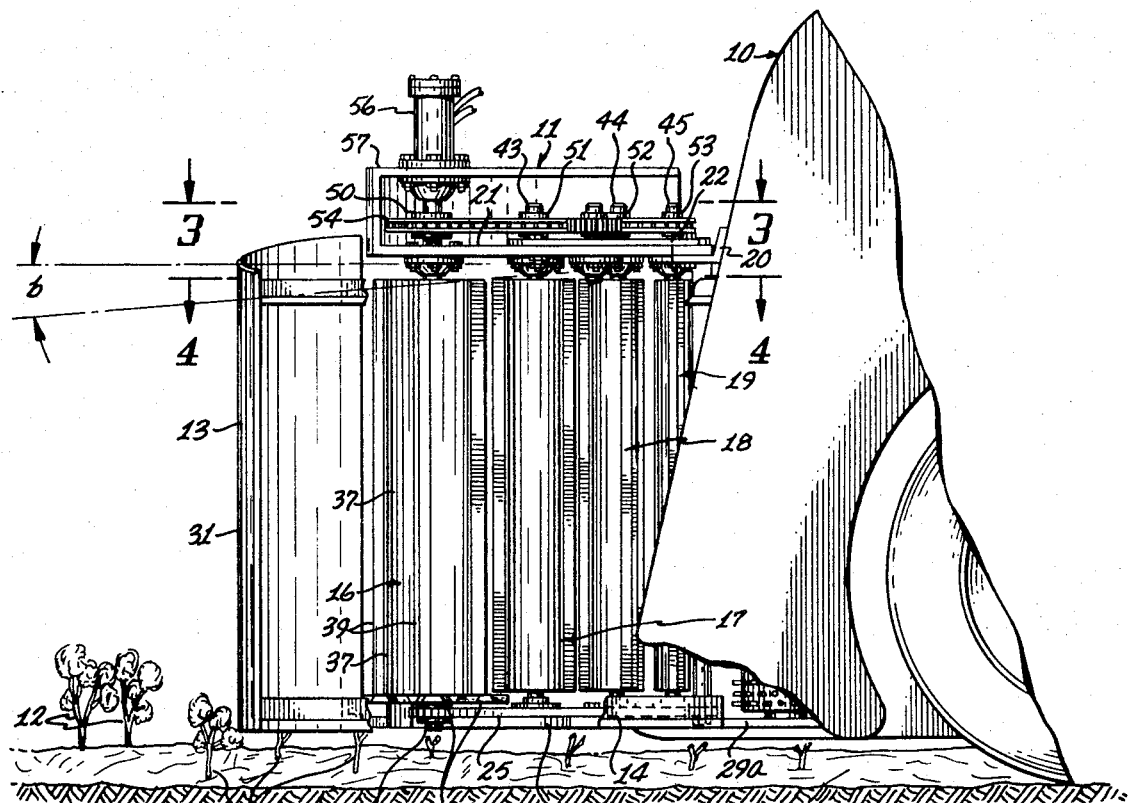
FIG. 1 is a side elevational view partly broken away of a device constructed in accordance with the teaching of the present invention and showing its attachment to the front end of a modern cotton harvesting machine.

The frame of accumulators 13 further comprises horizontally arranged bottom shelves 25, 25' which are pivotally bolted to horizontal plates or angle iron brackets 26, 26'. The relative angular position of shelves 25, 25' with each other is adjustable by bolts 27, 27' extending within arcuate slots 28, 28' formed in a horizontal platform 29. As shown in FIG. 1 the horizontal platform 29 may be provided with an extension 29a which extends under the cotton picking fingers of harvester 10.

Platform 29 is welded to brackets 26, 26' as shown in FIGS. 4 and 5, and is provided with a toothlike protrusion 30 for separating the cotton stalks and directing them toward the cutter 16, 16'. Although the platform 29 is shown substantially horizontally with the ground and the cutters 16 and 16' and walkers 17, 17'; 18, 18'; and 19, 19' substantially vertically arranged thereto, it is shown in FIG. 1 that the device 11 may be tilted downwardly a given angle b so that the plant stalks are handled as hereinafter described.

In order to expedite the movement of the cotton stalks into the area of cutters 16, 16' each accumulator is provided curved skins or upright housing members 31, 31' which cooperate as shown in FIGS. 2 and 4 to not only enclose the accumulator structure but to form arms of a plant gathering mechanism which define plant passageways 32, 32' with protrusion 30. As shown in FIGS. 3 and 4, platform 29 is further provided with a plurality of slots 33 and 34 which provide passageways for the dirt, stones, etc. picked up by the accumulator to drop back again to the ground.

As further noted from FIGS. 3 and 4 of the drawings the cutters 16, 16' and walkers 17, 17'; 18, 18' and 19, 19' are suitably journaled in shelves 21, 21' and 25, 25'. Any movement of the top shelf for relative adjustment of the cutters and walkers causes relative movement of the lower shelves and when properly positioned bolts 27, 27' are fixedly secured in slots 28, 28' to lock in that given relationship the cutter and walker structures.

Referring more particularly to cutter 16, 16' each cutter comprises a stationary knife blade 34a, 34a' appropriately fixed to platform 29. Cooperating with these stationary knife blades are rotary knife blades 35, 35' mounted on and suitably circumferentially spaced around shafts 36, 36', respectively. The cutters 16, 16' further comprise cylindrical housing 37, 37' extending longitudinally of shafts 36, 36' between shelves 21, 21' and 25, 25'. Circumferentially spaced around and mounted on housings 37, 37' and longitudinally thereof are a plurality of right angle brackets 39, 39'. These brackets grab the cut cotton stalks 12 and move them into the accumulator upon rotation of the shaft and housing structure.

Each of the walkers 17, 17'; 18, 18' and 19, 19' have cylindrical housings 40, 40'; 41, 41' and 42, 42', mounted on shafts 43, 43'; 44, 44'; and 45, 45', respectively. Each shaft is suitably joined in shelves 21, 21' and 25, 25' in the same manner as shafts 36, 36'. Each cylindrical housing extends longitudinally of its associated shaft and is secured thereto for rotation therewith. Circumferentially spaced around their outer peripheries and longitudinally of the cylindrical housing are a plurality of angle brackets 39, 39' which move back into the accumulator the cut cotton stalks in the same manner as angle brackets 39, 39' of housing 37, 37'.

Figure 8:
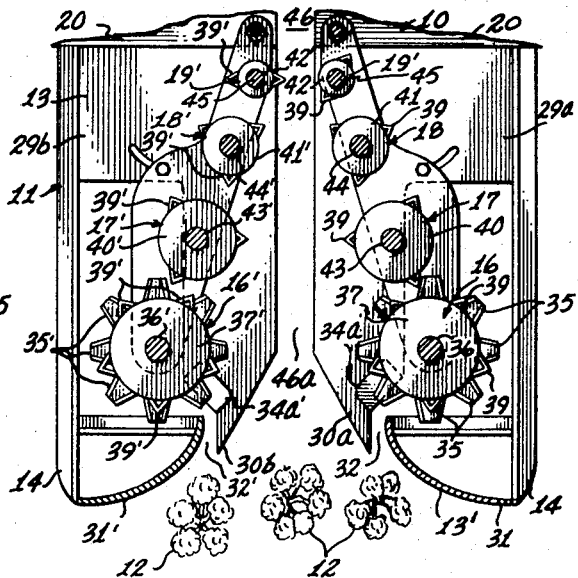
FIG. 8 is a cross-sectional view similar to FIGS. 4 and 7 wherein the device is further modified to cut two portions of a given strip of cotton, leaving a center portion of the strip uncut.
Figure 10:
FIG. 10 shows the intertwining of a cut and uncut planting of cotton.
Figure 9:
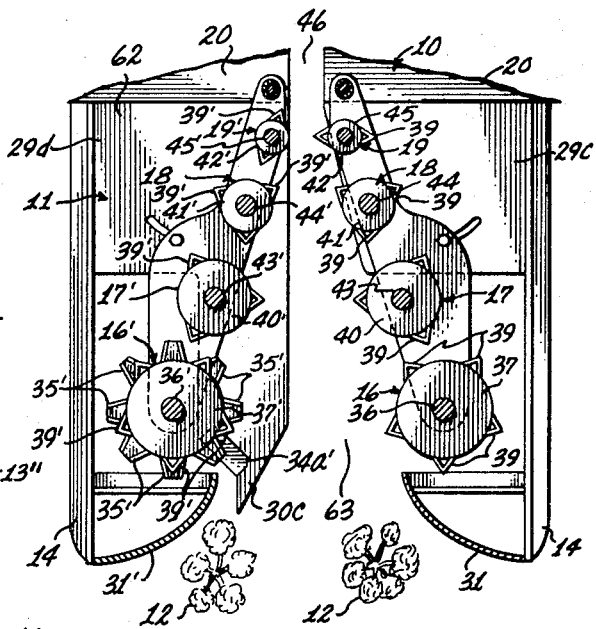
FIG. 9 is a cross-sectional view of a further modification of FIGS. 4, 7 and 8 wherein a single cutting arrangement is shown for cutting a first portion of a strip and a second portion of the width of the strip is passed through the device uncut.

The cylindrical housings forming the walkers 17, 17'; 18, 18' and 19, 19' are arranged in a converging manner, as shown, so that the cut cotton stalks are passed from one rotating cylindrical housing to another until they reach the entrance ways 46, 46' of harvester 10. When device 10 is tilted downwardly by angle b as shown in FIG. 1, the bottoms of the stalks are moved into the accumulator before the tops of the stalks. This may be important when some of the stalks remain uncut as shown in FIGS. 8, 9 and 10 of the drawings so that the tops of the cut stalks intertwine with the tops of the uncut stalks before being cut and moved through the accumulators.

Shafts 36, 36'; 43, 43'; 44, 44'; and 45, 45' are journaled as mentioned before in shelves 21, 21' and 25, 25' and project through the bearings formed in the upper shelves 21, 21' sufficiently to mount upon their extruding ends chain sprockets 50, 50'; 51, 51'; 52, 52' and 53, 53', respectively.

The speed of the smaller cylindrical housings in the converging direction of the throat handles the increased quantity of cotton stalks approaching the narrow neck of the accumulator. Thus, an overloading or jamming of the accumulator does not occur.

Sprockets 50, 50'; 51, 51'; 52, 52' and 53, 53' are driven by sprocket chains 54, 54' from sprockets 50, 50', respectively. Sprockets 50, 50' are driven by any suitable means which may be for example, electric or hydraulic motors 56, 56' driven directly by harvester 10. Motors 56, 56' are suitably mounted on a bracket 57, 57' which at least partially enclosed the sprocket and chain drive arrangement.

In accordance with the invention claimed, cotton stalks randomly grown are gathered into the accumulators by the protrusions 30, 30', and the skins 31, 31' forming the nozzles 32, 32'. The cutters 16, 16' which may employ both stationary and moving cutting blades or only the moving cutting blade as well known in the art, cut the gathered plants and immediately walk or move them back into the accumulator structure where the walkers 17, 17'; 18, 18'; and 19, 19' sequentially take the cut stalks and move them into the opening 46, 46' of the accumulator of the harvester where the bolls are separated from the stalks.

In FIG. 6 a modification of the walker structure 17, 17'; 18, 18'; and 19, 19' is shown. In this modification the walkers 17 and 18 are removed and a cylindrical housing 60 minus the angle brackets of cylindrical housing 42 of FIG. 4 is substituted therefor. A belt 61 is tightly fitted around cylindrical housing 37 and housing 60 which forms a moving surface for moving the cut cotton stalks into the throat of the accumulator.

Figure 7:
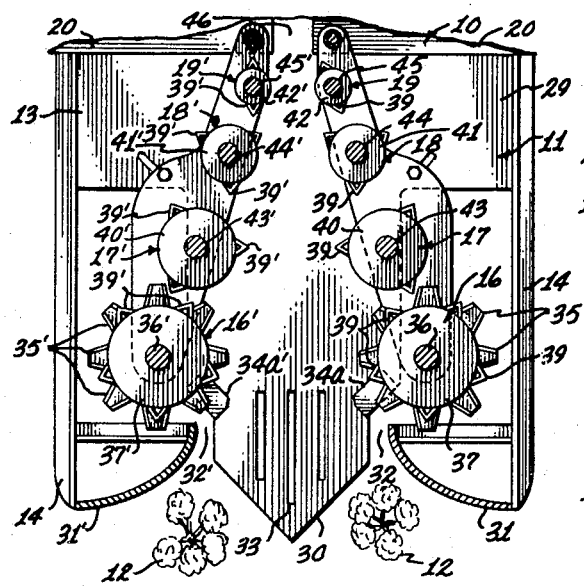
FIG. 7 is a cross-sectional view similar to FIG. 4 showing a modification of the device shown in FIG. 1 wherein two cutting blades cut all of a given strip of cotton plantings.

FIG. 7 illustrates that two spaced rows of cotton plants 12 may be readily moved through the accumulator 13, cut en route and moved into the harvester 10.

If desired as illustrated in FIG. 8 the platform 29 and protrusion 30 may be modified to comprise two parts 29a' and 29b each with a toothlike protrusion 30a and 30b. Platform 29a' and 29b are separated a predetermined distance to define a passageway 46a through the accumulator 13' so that one or more rows of cotton stalks or randomly spaced stalks may move through the accumulator without being cut.

The protrusions 30a and 30b together with the skins 31 and 31' direct the outer of the three rows shown in FIG. 8 into the accumulator 13' where they are cut and moved into contact with and intertwined with the center uncut row of cotton. If the accumulator was tilted forward by angle *b* as heretofore explained the intertwining of the tops of the latter cut stalks of cotton in the outer rows shown in FIG. 8 will occur before the outer rows have been cut. Therefore, the cut rows will remain standing as shown in FIG. 10 after being cut and moved through accumulator 13+ and harvester 10. This important function will permit the harvester to harvest a field more than once if unripe bolls remain on the cut and uncut stalks or if some cotton bolls were missed during a previous picking operation.

FIG. 9 illustrates a modification of the structure shown in FIGS. 7 and 8 wherein the accumulator 62 comprises the same walkers, cutting blades, etc. as shown in FIGS. 1–5 for the left side of the accumulator but the right side of the accumulator has been modified by removing knife blades 35 from shaft 36 retaining the angle brackets 39. Further the platform 29 comprises two parts 29c and 29d which define a passageway 63 through the accumulator adjacent the shafts 36, 43, 44 and 45 and their respective cylindrical surfaces 37, 40, 41 and 42 and angle brackets 29. The cylindrical surfaces of these are intended to move through the accumulator one or more rows of uncut cotton stalks.

Part 29d of the platform is provided with a toothlike protrusion 30c which functions in the same manner as one-half of the protrusion 30 to direct one or more rows of cotton stalks into the cutting blades 34a', 35' to cut the stalks and then move them through the accumulator as heretofore described.

Figure 11:
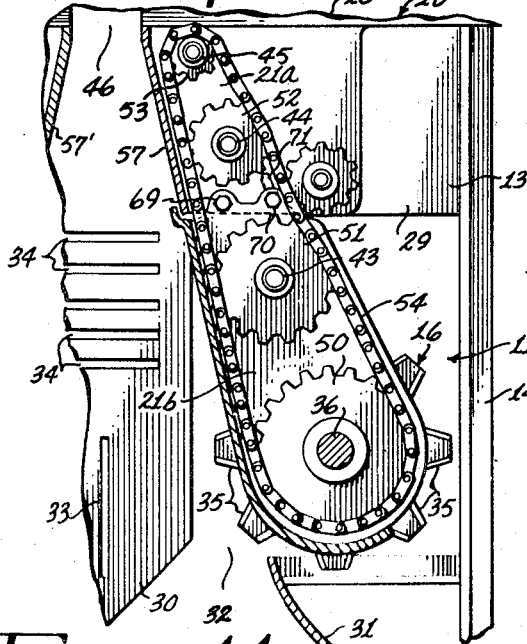
FIG. 11 shows a further modification of FIG. 3 wherein the first two shafts of the device are laterally adjustable.

FIG. 11 illustrates a further modification of the structure shown in FIGS. 1–6 wherein accumulator 13'' comprises the walker structure 17, 17'; 18, 18' and 19, 19'. In this modification shafts 36 and 43 are rotatably mounted on shelves similar to shelves 21, 21' and 25, 25' as described for FIGS. 1–5 except that each shelf is divided into two parts 21a, 21a' and 21b, 21b' and 25a, 25a' and 25b, 25b'. Since only shelf parts 21a, 21b are shown for purposes of illustration it is believed that its description in view of the preceding description for FIGS. 1–5 will render the structure clear one skilled in the art.

By pivotally mounting shelf part 21b about bolt 69, shafts 36 and 43 can be rotatably positioned to control the diverging walls of the passageway through the accumulator. The relative angular position of the parts 21a and 21b to each other is adjustable by bolt 70 extending within arcuate slot 71 formed in part 21a of the horizontal platform.

Although but a few embodiments of the present invention have been illustrated and described, it will be apparent to those skilled in the art that various changes and modifications may be made therein without departing from the spirit of the invention or from the scope of the appended claims.

What is claimed is:

1. A method of harvesting stalklike plants wherein said plants are retained in substantially their upright growing position comprising the steps of converging the plants together cutting some of the stalks near the ground, intertwining the tops of the plants, and feeding the intertwined cut and uncut stalks through a harvester.

2. The method steps set forth in claim 1 wherein the intertwining and cutting of some of the stalks is done substantially simultaneously.

* * * * *